United States Patent
Cole et al.

(10) Patent No.: US 10,843,584 B2
(45) Date of Patent: Nov. 24, 2020

(54) SYSTEM AND METHOD FOR AUTOMATIC CONNECTOR COUPLING FOR AN ELECTRIC VEHICLE

(71) Applicant: ABB Schweiz AG, Baden (CH)

(72) Inventors: Gregory A. Cole, West Hartford, CT (US); William J. Eakins, Coventry, CT (US); Martin Krucinski, Glastonbury, CT (US); Sangeun Choi, Simsbury, CT (US); Thomas A. Fuhlbrigge, Ellington, CT (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/182,129

(22) Filed: Nov. 6, 2018

(65) Prior Publication Data

US 2020/0139820 A1    May 7, 2020

(51) Int. Cl.
  *B60L 53/35* (2019.01)
  *B60L 53/16* (2019.01)
  *H01R 13/447* (2006.01)
  *H01R 43/26* (2006.01)
  *H02J 7/00* (2006.01)

(52) U.S. Cl.
  CPC ............ *B60L 53/35* (2019.02); *B60L 53/16* (2019.02); *H01R 13/447* (2013.01); *H01R 43/26* (2013.01); *H01R 2201/26* (2013.01); *H02J 7/0045* (2013.01)

(58) Field of Classification Search
  CPC ..................................................... B60L 53/35
  USPC ....................................................... 320/109
  See application file for complete search history.

(56) References Cited

U.S. PATENT DOCUMENTS

| | | | |
|---|---|---|---|
| 5,821,731 A | * | 10/1998 | Kuki ............ B60L 53/12 320/108 |
| 2009/0079388 A1 | | 3/2009 | Reddy |
| 2018/0001777 A1 | | 1/2018 | Kilic |

FOREIGN PATENT DOCUMENTS

| | | |
|---|---|---|
| DE | 102009001080 A1 | 8/2010 |
| DE | 102016008982 A1 | 2/2017 |
| DE | 102017007818 A1 | 1/2018 |
| WO | WO 2009/094517 A2 | 8/2010 |

OTHER PUBLICATIONS

European Patent Office, International Search Report in International Patent Application No. PCT/IB2019/059515, 4 pp. (dated Jan. 29, 2020).
European Patent Office, Written Opinion in International Patent Application No. PCT/IB2019/059515, 8 pp. (dated Jan. 29, 2020).

* cited by examiner

*Primary Examiner* — Edward Tso
*Assistant Examiner* — Ahmed H Omar
(74) *Attorney, Agent, or Firm* — Leydig, Voit & Mayer, Ltd.

(57) ABSTRACT

A connector arrangement for charging an electric vehicle includes a first connector disposed adjacent a slide surface and having a pin extending from the first connector. A second connector has a second connector body and is moveable along the slide surface by a linkage mechanism. A socket extends through the second connector body between two opposed openings, and at least one sensor is associated with the second connector body. The at least one sensor provides information indicative of a location of the second connector body on the slide surface to the linkage mechanism.

20 Claims, 9 Drawing Sheets

SYSTEM AND METHOD FOR AUTOMATIC CONNECTOR COUPLING FOR AN ELECTRIC VEHICLE

TECHNICAL FIELD

The present disclosure relates to charging systems and methods for electric vehicles and, more particularly, to a connector for effecting an electrical connection between a vehicle charger and the vehicle.

BACKGROUND

Use of electrical vehicles is becoming increasingly popular due to the environmental benefits of removing pollution caused by fossil fuel burning vehicle engines from the environment, especially in densely populated urban environments. As with most mobile electrical devices, electrical vehicles carry electrical power storage devices or batteries, which provide power to the vehicle propulsion and other systems. As can be appreciated, the vehicle batteries require periodic recharging to provide consistent vehicle operation.

At present, electric vehicle recharging is a time consuming process that is typically carried out over long periods, for example, overnight or during prolonged periods when the electric vehicle is parked. Power dispensers include flexible conduits or wire bundles that include a connector at their end, which plugs into a vehicle receptacle and then begins the transfer of power from the dispenser the vehicle's battery.

Traditional vehicle power dispensers operate at around 200-240 Volt AC, and transfer about 30 Amp of electrical power into a vehicle. As a consequence, providing a full charge to a vehicle can take up to 10 hours or more. With the increase in popularity of electric vehicles, faster charging solutions are required, especially for vehicles that operate for more than 12 hours per day such as emergency vehicles, public transportation, professional vehicles and the like.

SUMMARY OF THE DISCLOSURE

In one aspect, the disclosure describes a connector arrangement for charging an electric vehicle. The connector arrangement includes a first connector disposed adjacent a slide surface and having a pin extending from the first connector. A second connector has a second connector body and is moveable along the slide surface by a linkage mechanism. A socket extends through the second connector body between two opposed openings, and at least one sensor is associated with the second connector body. The at least one sensor provides information indicative of a location of the second connector body on the slide surface to the linkage mechanism.

In another aspect, the disclosure describes a method for automatically aligning and engaging two connectors for charging an electric vehicle. The method includes providing a slide surface having a planar shape that is delimited by end walls, providing one connector at a corner of two end walls of the slide surface, and placing a mating connector on the slide surface. The method further includes moving the mating connector in one direction until the mating connector contacts an end wall, and aligning the mating connector with the end wall. The method also includes moving the mating connector in another direction along the end wall, placing the mating connector in the corner, and pushing the mating connector to mate with the connector.

In yet another aspect, the disclosure describes a method for automatically coupling a charging side connector with a vehicle connector. The method includes lifting the charging side connector with a linkage mechanism to meet a surface on an underside of the vehicle, and providing a slide surface having a planar shape that is delimited by end walls on the underside of the vehicle. One connector is provided at a corner of two end walls of the slide surface. The method further includes placing a mating connector on the slide surface, moving the mating connector along the slide surface in one direction until the mating connector contacts an end wall, aligning the mating connector with the end wall, moving the mating connector in another direction along the end wall, placing the mating connector in the corner, and pushing the mating connector to mate with the connector.

Further and alternative aspects and features of the disclosed principles will be appreciated from the following detailed description and the accompanying drawings. As will be appreciated, the principles related to systems, methods, and software for establishing electrical connections as disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

The present disclosure relates to electrical connectors for effecting connections that deliver electrical power to fast charge a battery or other power storage device on an electric vehicle. An increase in power delivery to the vehicles using existing connectors, conduits and power dispensers to achieve a faster charge is not well suited and cannot handle a dramatic power increase, which can be in the range of transferring 500 Amp of electrical current at a potential of about 1,600 Volt. Previously proposed solutions for high voltage and high current power transfer to charge electric vehicles are not practical in that a considerable increase to the size and spacing of connector pins on a connector that connects power to charge the vehicle to the vehicle is required to handle the increased voltage and current. This is because a minimum air distance must be maintained between conductors of opposite polarities that carry high electrical potential. Moreover, increased voltage and current delivery through a conduit to a vehicle using a manually operated vehicle electrical connection process, as is currently done, might be cumbersome due to the large size of the connectors that are required, and difficult for a user to accomplish in that the force required to engage connectors between a power dispenser and the vehicle can be larger than some users can manually achieve.

Figure 1:
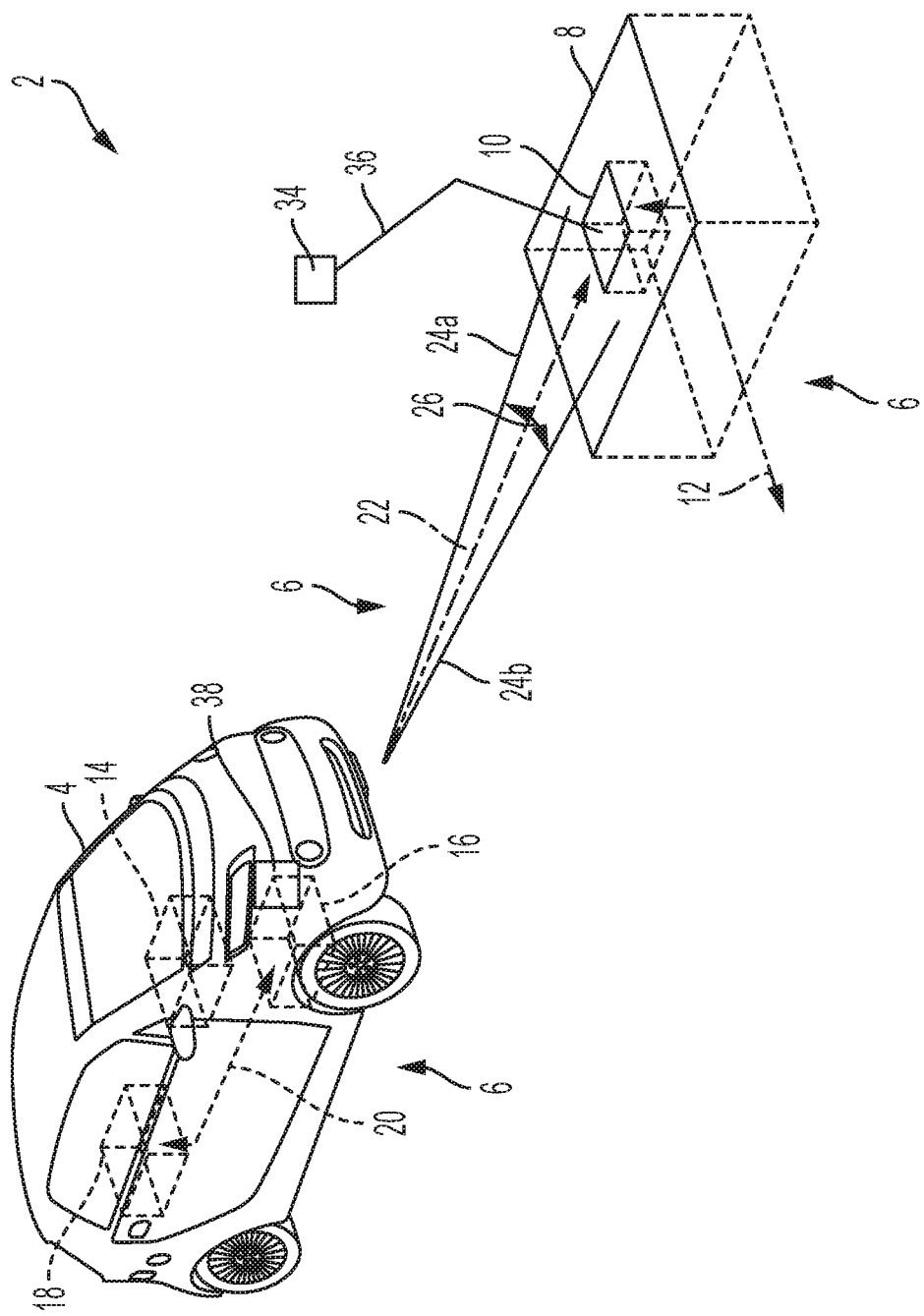
FIG. 1 is a perspective view of an electric vehicle (EV) charging environment according to an embodiment of the disclosure.

FIG. 1 is a perspective view of an electric vehicle (EV) charging environment 2 according to an embodiment of the disclosure. In the example shown in FIG. 1, an EV 4 is positioned on a ground surface 6. EV 4 is a car, as shown in FIG. 1. Alternatively, EV4 may be a truck, a motorcycle, a moped, a truck or bus, a farm implement or any other on- or off-highway vehicle. In the example shown, ground surface 6 is a floor of a garage of a home or business. Alternatively, ground surface 6 may be a surface of a parking lot. Environment 2 includes a floor unit 8. Floor unit 8 is positioned on or, at least in part, beneath ground surface 6. Depending on application, and also on the ground clearance of the vehicle, the floor unit 8 may be fully or partially disposed beneath the ground surface, or may alternatively be disposed on the ground surface, for example, when installed on existing floors. Floor unit 8 includes a connector and control unit 10. At least a portion of connector unit 10 faces and is exposed or exposable to ground surface 6. The connector unit 10 that is operatively coupled to or associated with an electric power source (e.g., a utility grid, not shown in FIG. 1), either directly or through a transforming or conditioning device such as a transformer. A first electric power flow 12 can thus be selectively enabled between power source and floor unit 8, including to connector unit 10.

EV 4 includes a drivetrain 14 providing motive power to the EV 4 for driving. EV 4 includes a vehicle unit 16 and at least one power storage device such as a battery 18. Battery 18 is operatively coupled to drivetrain 14 for providing electric power thereto to enable providing motive power for EV 4 selectively during operation. Structures and systems of the EV 4 that accomplish the provision of power to the drivetrain 14 selectively by an operator (now shown) of the EV 4 are omitted for simplicity. At least a portion of vehicle unit 16 faces and is exposed or exposable to ground surface 6. It is noted that, while the EV 4 is shown in one orientation as it approaches the floor unit 8, any orientation of approach is also contemplated. Vehicle unit 16 is operatively coupled to battery 18 to provide an interface for providing electrical power to charge the battery 18. A second electric power flow 20 is thus enabled between vehicle unit 16 and battery 18.

In the EV charging environment 2 shown in FIG. 1, EV 4 is being driven and approaches the floor unit 8 including connector unit 10. A driver of EV 4 (e.g., a human driver and/or an autonomous vehicle driving system, not shown in FIG. 1) steers or otherwise controls the EV 4 to floor unit 8 including connector unit 10 along a centerline path 22. As shown in FIG. 1, centerline path 22 extends from EV 4 to at least approximately a center point of connector unit 10 proximal ground surface 6. Based on the particular dimensions and other specifications of EV 4, floor unit 8 including connector unit 10, and/or vehicle unit 16, an approach path of EV 4 to floor unit 8 including connector unit 10 may deviate from the target centerline path 22 by an allowable deviation 24. The allowable deviation may be in any direction, including but not limited to a horizontal or vertical direction. Allowable deviation 24 includes a driver side deviation 24a and a passenger side deviation 24b. An allowable deviation angle 26 is defined between lines defining driver side deviation 24a and passenger side deviation 24b. In three dimensions, the deviation angle 26 may form a conical area that accounts for height of ground clearance of the vehicle, as well pitch, yaw and roll of the vehicle's trajectory during the approach to the floor unit 8, and also during the connection and charging operations.

Figure 2:
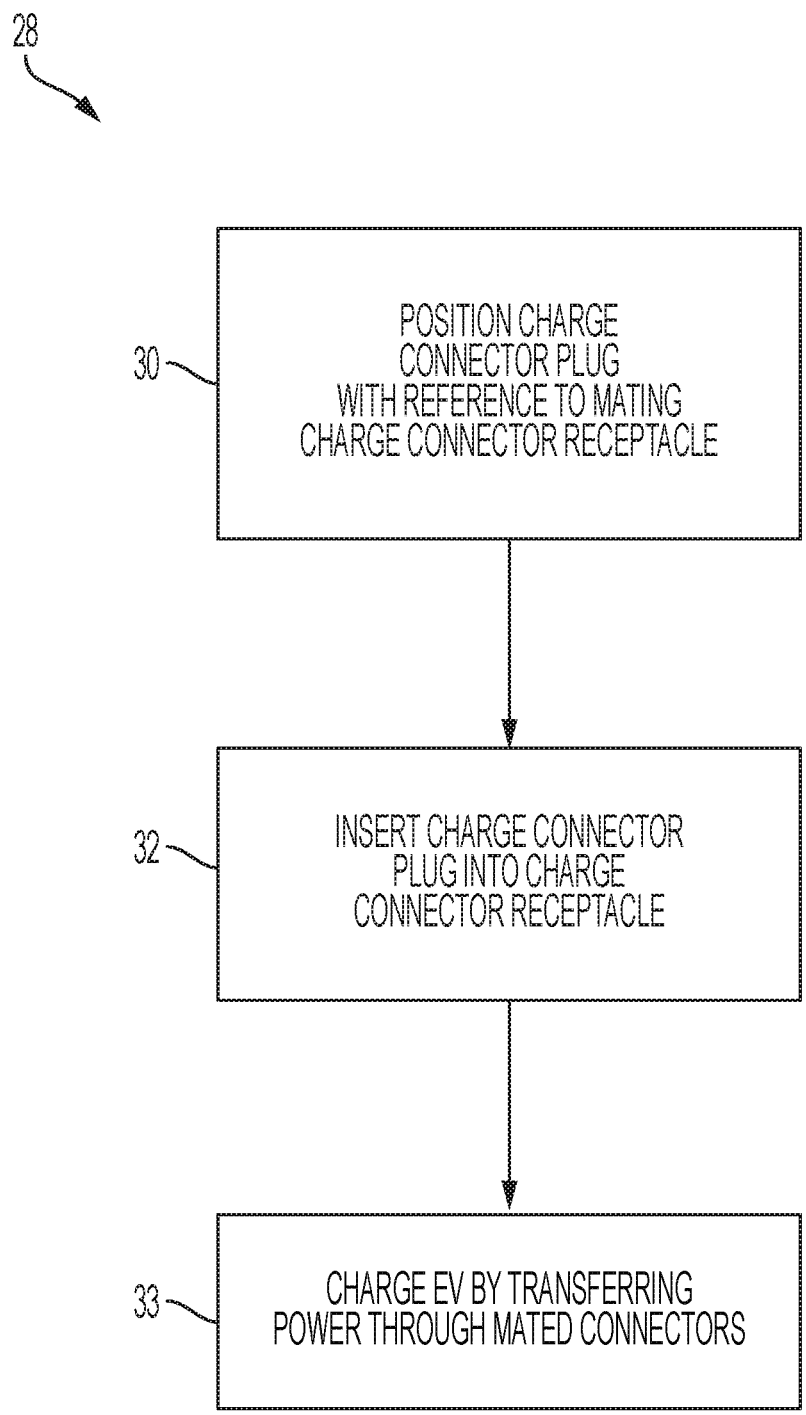
FIG. 2 is a flowchart of a method for underside charging of EVs according to an embodiment of the disclosure.

FIG. 2 is flowchart of a method 28 for underside charging of the EV 4 according to an embodiment of the disclosure. In an example, method 28 is implemented and performed, at least in part, by a mechanical and electrical linkage system 36, which rises up from the floor 6 from the connector unit 10 and includes an electrical connector 34. The electrical connector 34 matingly engages a connector 38 associated with the vehicle unit 16 when the EV 4 is stationary over the floor unit 8 for charging.

Referring to FIG. 2, method 28 includes positioning at 30 the connector 34 on the floor unit 8 with reference to connector 38 on the EV 4 using linkage 36. Such placement may be carried out automatically. Method 28 further includes inserting at 32 the connector 34 into connector 38, and initiating a charging process at 33. When the connectors 34 and 38 are mated, a flow of electrical power from the power flow 12 is allowed to be transmitted from the floor unit 8 to the vehicle unit 16, and from there to the battery 18 to charge the battery. A breakable electrical connection between the connectors 34 and 38 is included in this power flow path that charges the battery 18. As can be appreciated, the environment in which the connectors 34 and 38 is harsh because one or both sides of the connectors 34 and 38 are exposed to the environment, road debris, etc. Moreover, the connectors 34 and 38 are advantageously compact to enable or facilitate manual and/or automatic coupling for charging the battery 18.

Figure 3:
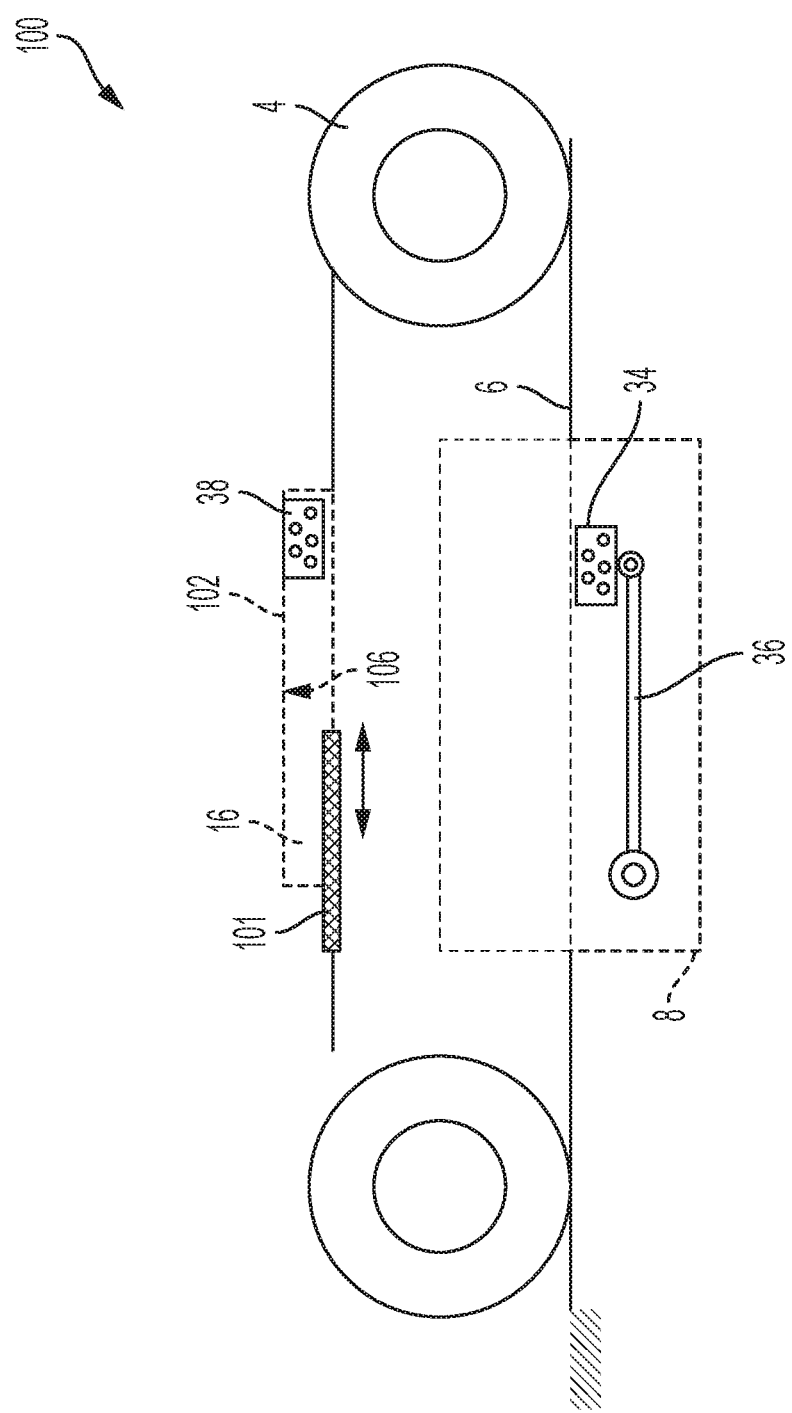
FIG. 3 is a schematic of a vehicle charging system in accordance with the disclosure.

A schematic view of an exemplary installation for a charging system 100 is shown in FIG. 3. In this embodiment, the linkage 36 associated with the floor unit 8 carries the connector 34, which is can be lifted by the linkage during a coupling operation with the connector 38 of the vehicle 4. The linkage 36 is autonomously moveable and responds to command signals provided by the control unit 10. In this position, the EV 4 has been parked over the floor unit 8 such that the vehicle unit 16 disposed above the floor unit 8. In this embodiment, it can be seen that the floor unit 8 is sunk into the floor 6 such that the linkage 36 must raise the connector 34 to meet and mate with the vehicle connector 38 for charging. Following a charging operation, the linkage 36 and connector 34 retract back into the floor unit 8.

The vehicle unit 16 includes a base plate 102 and a moveable door 101, which covers the vehicle unit 16 to protect internal components during vehicle service, and opens to allow access to the connector 38 during charging. The door 101, which is selectively moveable by an actuator 103, further aids in the alignment of the connectors 34 and 38. The connector 38 includes pins that matingly engage in sockets formed in the connector 34. In one embodiment, the door 101 is moveable in a direction parallel to the pins of the vehicle connector 38 to facilitate coupling of the connectors 34 and 38, as will be described.

Figure 4:
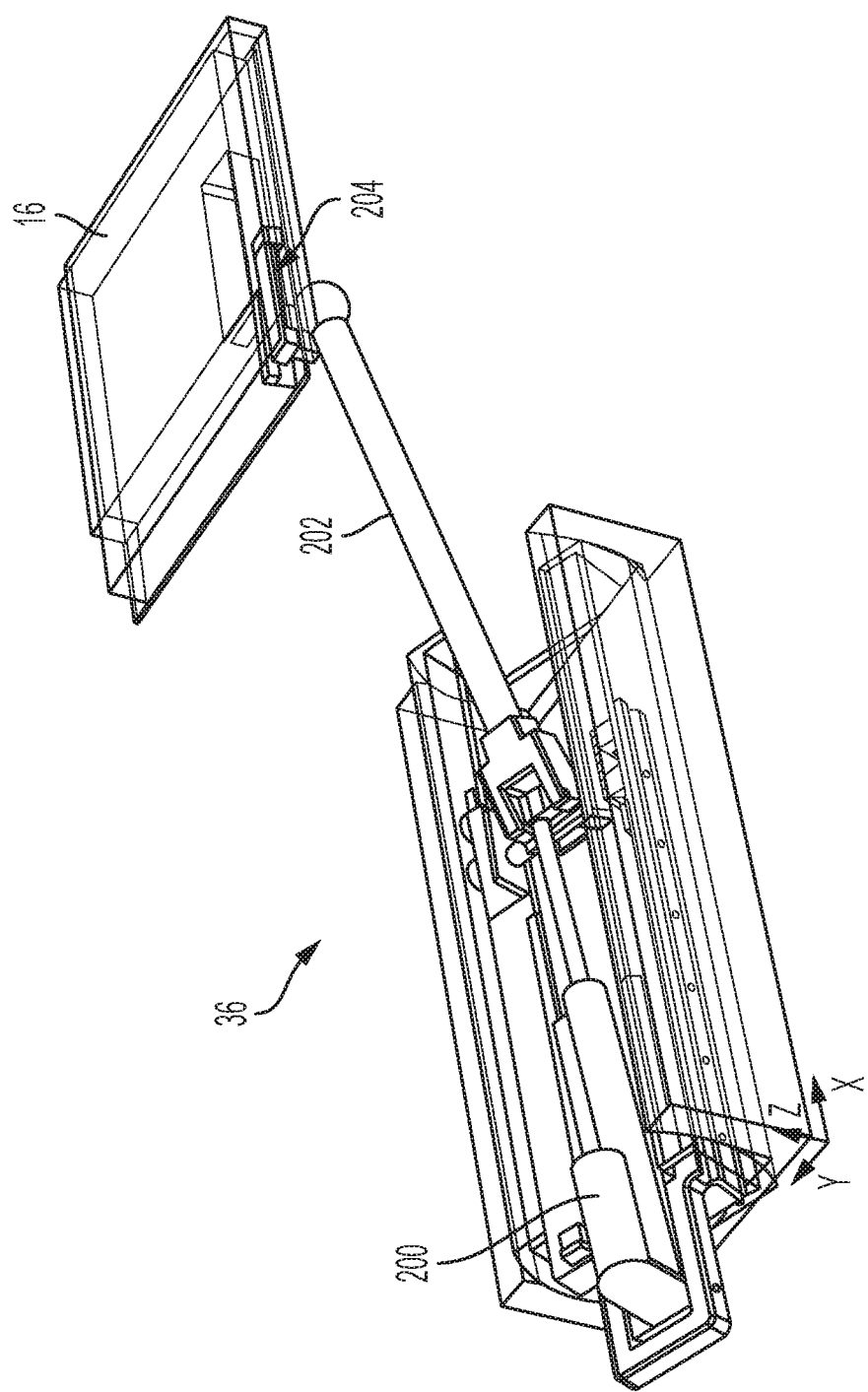
FIGS. 4 and 5 are outline views from different perspectives of a linkage system interacting with the charging receptacle in accordance with the disclosure.
Figure 5:
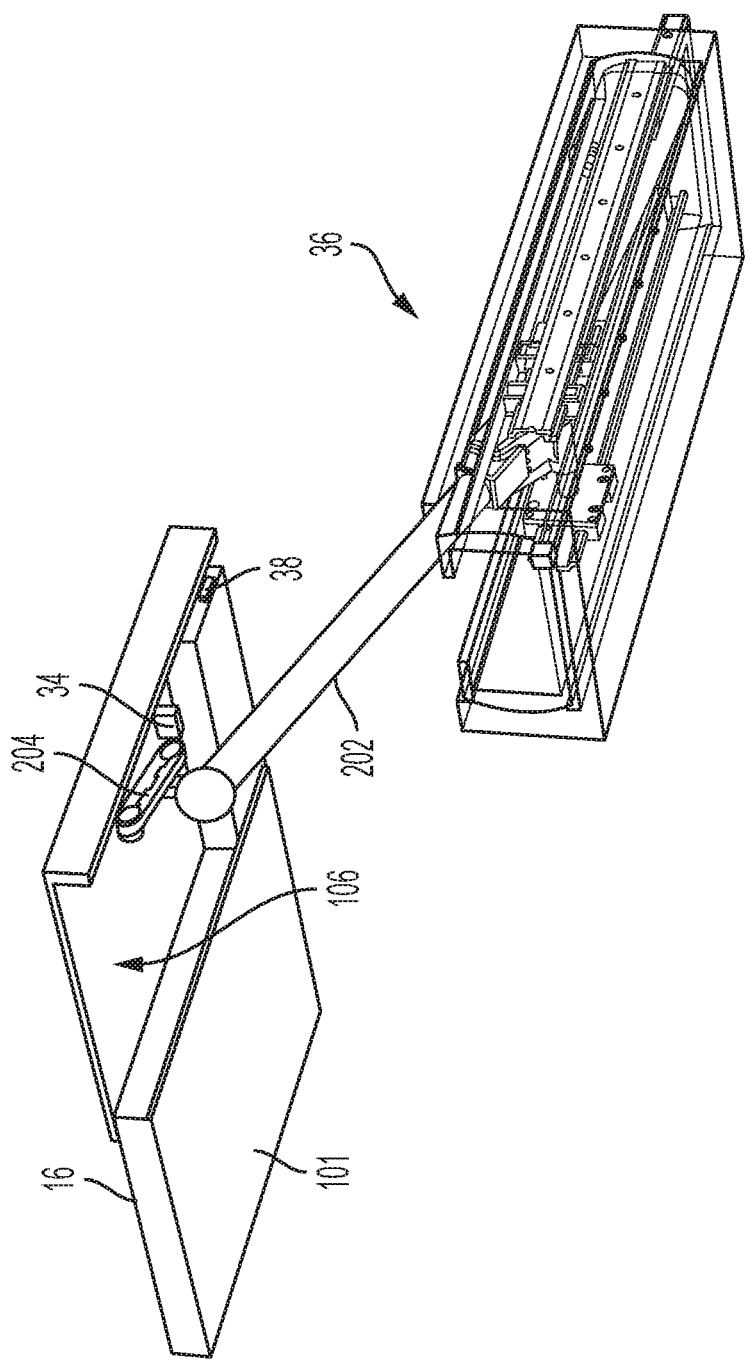

Outline views of one embodiment for the linkage 36 are shown in FIGS. 4 and 5. The linkage system 36 includes one or more actuator(s) 200 operably connected to and causing an arm 202 to move and/or rotate in various directions relative to X, Y and Z axes. A shuttle 204 is disposed at the end of the arm 202 and is moved thereby and through the action of the actuator(s) 200 to contact and selectively traverse a slide surface 106 in any desired direction. In one embodiment, the arm 202 can lift the shuttle 204 and cause it to move transversely relative to the slide surface 106, that is, move the shuttle in the Y and Z directions, while a linear actuator operating the door 110 may engage the shuttle 204 while it contacts the slide surface 106 push (and/or pull) the shuttle 204 in the X direction while contact with the slide surface 106 is maintained.

During a charging operation, the shuttle 204 carries the connector 34 (FIG. 1) and guides it into engagement with the connector 38 to charge the EV 4 (see FIG. 5). This requires guiding the connector 34 towards the connector 38 along the slide surface, aligning the connectors such that the pins of the connector 38 are able to enter the sockets of the connector 34, and pushing the connectors into engagement. Motion along the X axis is provided by the door 101 pushing the connector 34, while alignment in the Y direction is accomplished by action of the linkage 36. A partial schematic view of this arrangement is shown in FIG. 6 during an alignment process.

Figure 6:
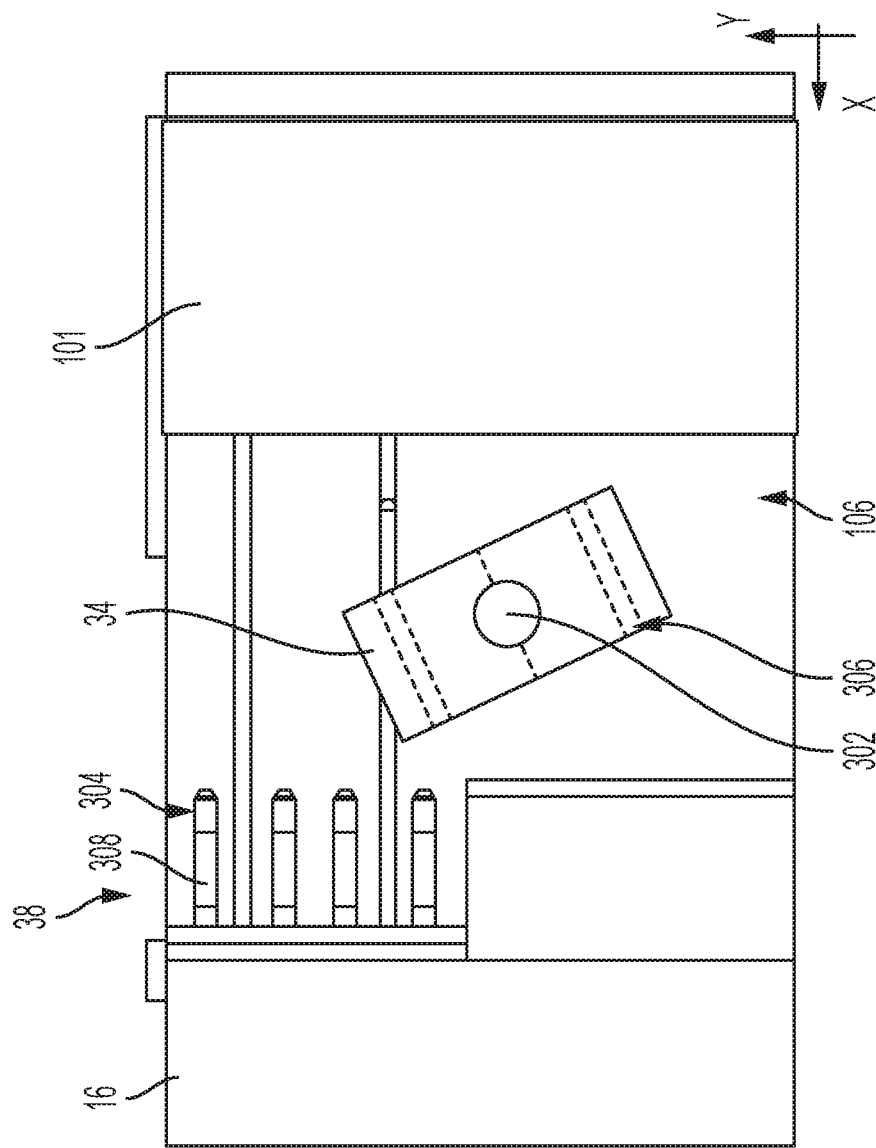
FIG. 6 is a partial view of a connector arrangement in accordance with the disclosure.

In reference to FIG. 6, it can be seen that the connector 34 includes a pivot connection 302 that allows rotation of connector about the Z axis while the connector is pressed against and slides on the slide surface 106 by action of the linkage arm 202 (FIG. 5). Pins 304 must align with sockets 306 (also see FIG. 7) for the connectors 34 and 38 to matingly engage. Motion along the X direction is provided by the door 101 that engages and pushes the connector 34 towards the connector 38. Motion along the Y direction is provided by the linkage 36, which also maintains the connector 34 in contact with the slide surface 106. The pins 304 having insulated tip and root portions, and include exposed metal connection surfaces 308 that electrically connect with collars 310 disposed along the sockets 306 formed in the body 312 of the connector 34, as shown in the enlarged, cross section view of FIG. 7. Therefore, to establish an electrical connection between connectors 34 and 38, the pins 304 must fully enter the sockets 306.

Figure 7:
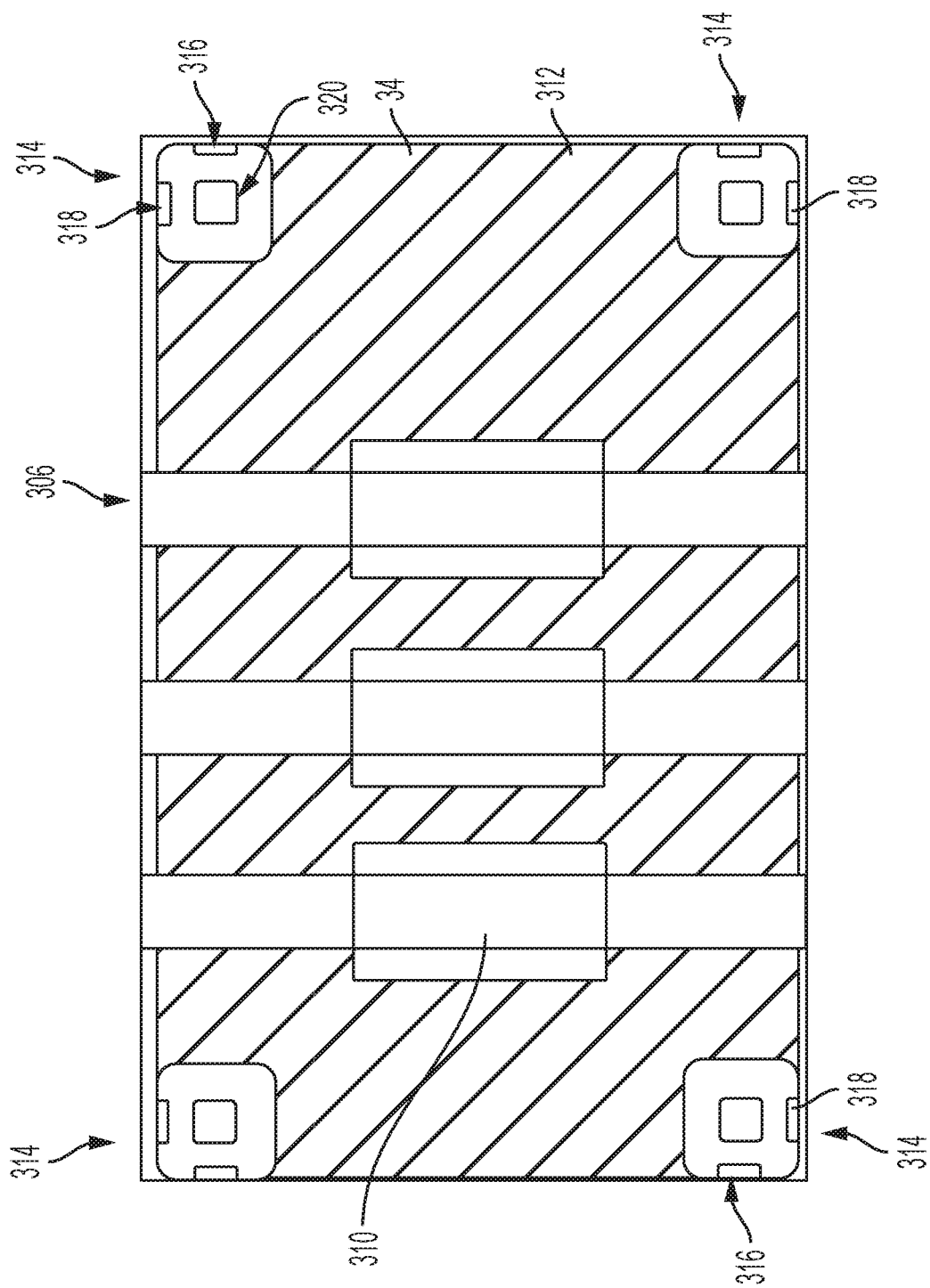
FIG. 7 is a schematic view of a connector in accordance with the disclosure.

To ensure proper alignment and electrical conductivity between the mated sensors 34 and 38, various sensors are used to guide the connector 34 towards the connector pins 304. One embodiment for such sensors is shown in FIG. 7, where the rectangular body 312 includes four sensor arrays 314, one disposed at each corner. More specifically, each sensor array 314 can include a first proximity sensor 316 facing in the X-direction, a second proximity sensor 318 facing in the Y-direction, a third proximity sensor 320 facing the Z-direction, and/or other sensors. The first, second and third proximity sensors 316, 318 and 320 may be disposed adjacent side faces of the body 312 such that, when the body 312 is close to or, in this case, touching a wall of the vehicle unit 16, the sensors will provide an indication to a controller controlling motion of the linkage and the door about the position and orientation of the connector body 312 on the slide surface 106 relative to the pins 304 of the connector 38.

More specifically, an alignment sequence of the connector body 312 on the surface 106 relative to the connector pins 304 is shown schematically in various phases in FIGS. 8A-8F. In reference to these figures, it should be appreciated that the linkage arm 202 and the door 101 move the connector body 312 around the slide surface 106 as previously described, while maintaining contact with the slide surface 106. In a first placement step, shown in FIG. 8A, the linkage arm lifts the body 312 and places it flat against the slide surface 106. For determining the flat placement of the body 312 with the slide surface 106, the controller receiving the signals form the four sensor arrays 314, for example, the control unit 10 (FIG. 1), which operates and directs motion of the linkage arm 202, may expect to see a positive proximity signal for all four sensor arrays 314, which indicates that all four corners of the body 312 are in contact with the slide surface 106. Signals from the sensor arrays 314 to the control unit 10 may be provided by any appropriate means including wired and wireless communication.

Figure 8A:
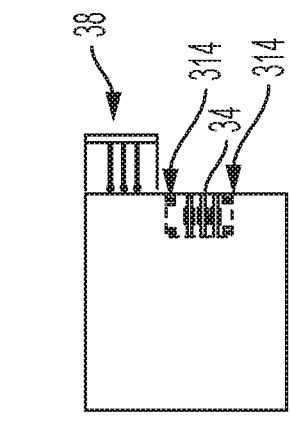
FIGS. 8A-8F are schematic views of different positions during a connector coupling in accordance with the disclosure.
Figure 8B:
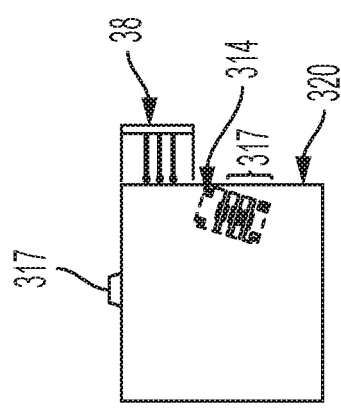
Figure 8C:
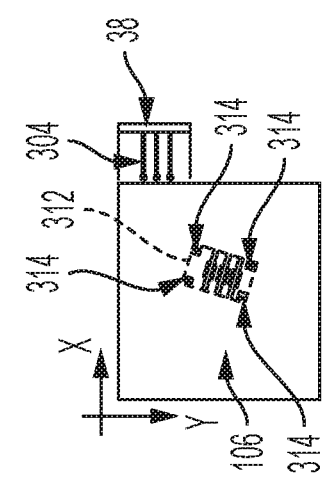

In a second step, the controller may cause the linkage arm or the door to move the body in one direction, for example, in the X direction as shown in FIG. 8B, or alternatively in the Y direction, until one corner sensor array 314 indicates that the body 312 has contacted an X-limit wall (or alternatively a Y-limit wall) 320. In one embodiment, sensors 317 associated with the end walls 320 or 322 provide an indication instead of, or in addition to, the sensor arrays 314, that the sensor body is contacting the end walls. Because the body is rotatably connected to by the pivot 302, the motion in the X (or Y) direction continues while the body 312 rotates until a second corner sensor array 314 touches the wall, as shown in FIG. 8C. At this position, the signal from two sensor arrays 314 indicates an alignment of the body with the X-limit wall 320 (or the Y-limit wall).

Figure 8D:
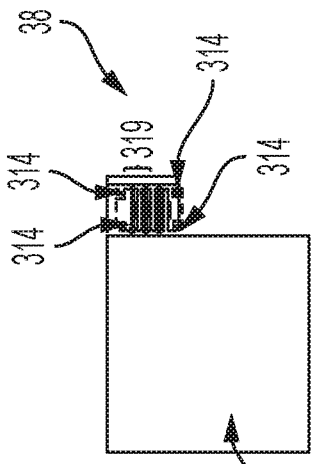

Once aligned with one wall, the linkage or door move the body in the Y-direction (or the X-direction in the alternative case) until a signal from a third sensor array 314 is received, which indicates that the body 312 is disposed in the corner of the slide surface 106, as shown in FIG. 8D. At this position, the body 312 is in proper alignment with the connector 38, i.e., the dimensions are selected such that the sockets 306 are aligned with the pins 304, and the door or linkage arm begins pushing the two connectors 34 and 38 into engagement. To avoid a possibility of damage, an optional protective door 315 may be added at the entrance to the cavity containing the pins 304. The door 315 may include an interlock that prevents its opening until the controller has indicated that the connector body 312 is properly in the corner and aligned with the end walls as shown in FIG. 8D. In this way, a condition in which a misaligned corner of the body touching the door, such as the position shown in FIG. 8B but in the area of the door 315, which may damage the pins or entangle the body 312 with the pins, can be avoided.

Figure 8E:
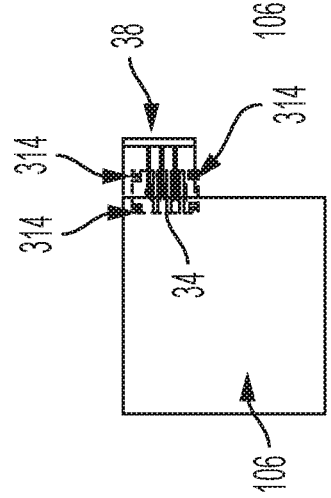
Figure 8F:
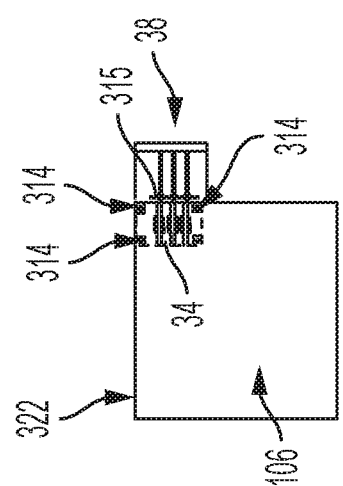

An intermediate engagement position is shown in FIG. 8E, where the body 312 is still not fully seated in the receptacle of the vehicle sensor 38. During this time, only the signal from the three sensor arrays 314 is received, which the controller construes as an indication that motion in the seating direction is still required. When the body 312 is fully seated in the connector 38, an indication from the fourth sensor array 314 is provided, as shown in FIG. 8F. In one embodiment, a sensor 319 associated with the connector 38 may provide an indication that the connectors are fully mated instead of, or in addition to, the signals from the four sensor arrays 314. At this position, the controller knows that the mating procedure is complete and that the two connectors are fully engaged with one another so the flow of electrical current to charge the battery of the vehicle can begin.

Figure 9:
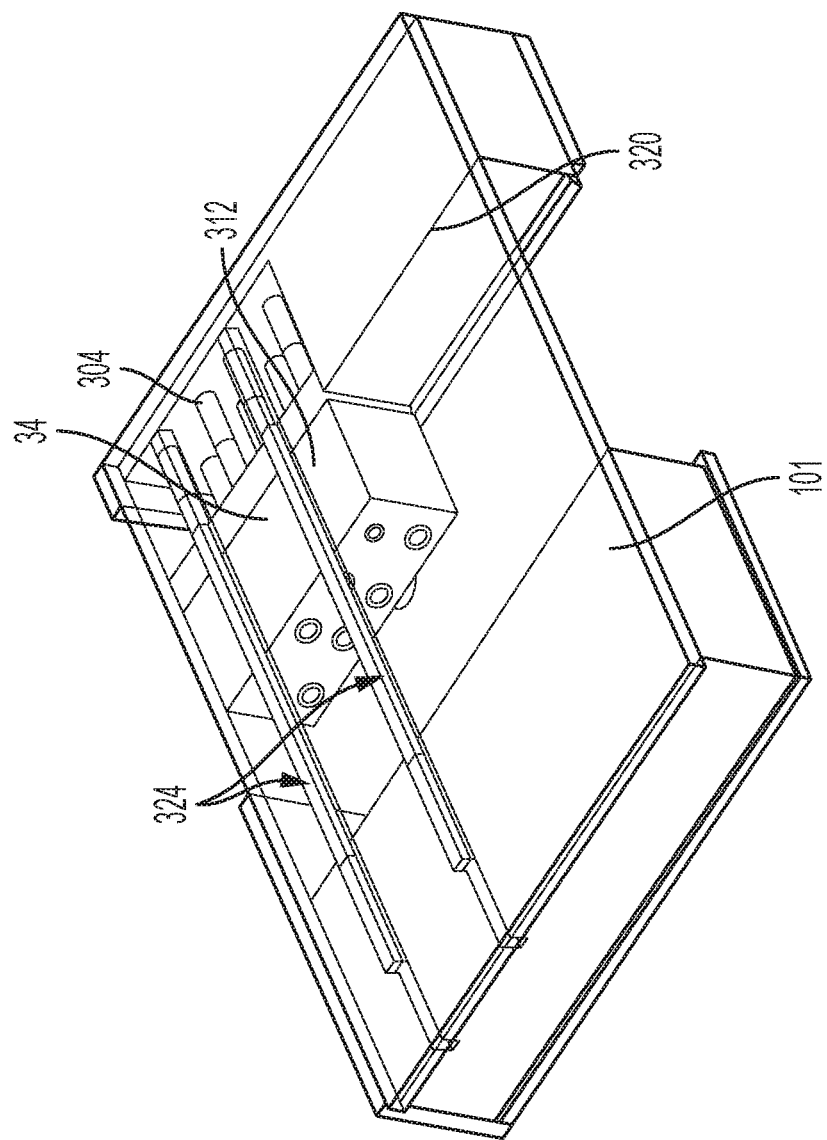
FIG. 9 is a partial view of a connector de-coupling in accordance with the disclosure.

A partial outline view of the area around the connectors 34 and 38 is shown in FIG. 9 to illustrate one embodiment for disengaging the body 312 from the pin 304. In this embodiment, a pair of pull bars 324 are axially constrained to move with the door 101 when the door moves in an opening direction. The bars 324 are also constrained to engage the body 312 when the body is in the engaged position with the pins such that, when a charging operation us complete, retraction of the door 101 will also pull the body 312 away from the pins 304 to disengage the connector 34 from the connector 38. Using the sensor signals, the controller can determine that the disengagement is complete when the only two signals received are those from the two sensor arrays touching the Y-limit wall 322, and the body 312 can be lowered.

As can be appreciated, by use of the four sensor arrays, or a similar sensor arrangement, placement, orientation and mating of the connectors can be automated to charge the electric vehicle. These processes can be carried out in stages or steps, which are summarized for one exemplary embodiment in Table 1 below. In the table, an exemplary location of each sensor is discussed relative to the orientation shown in FIG. 7, but it should be appreciated that these orientations are only provided for the sake of discussion and are not exclusive or limiting:

nector into engagement with the vehicle, a determination of full connector engagement may be made by a travel sensor on the door or cover, which indicates full insertion of one connector into the other, instead of or in addition to readings from the sensor arrays on the connector body.

It should be appreciated that additional sensor providing system information can also be used. For example, one or more temperature sensors can be embedded in the connector body and/or the mating connector pins to monitor temperature during a charging operation. Defective, damaged or dirty electrical contact surfaces may cause a temperature increase during charging, which a controller can monitor and pause or cease the charging operation.

A spring loaded door may also be added to both protect the pins of connector 38 from damage or debris or dirt accumulation, help the body sensors detect the placement of the body in the corner by sensing contact along the entire corner and, when equipped with a sensor or switch, provide an indication that connector mating has begun or has ended. In one embodiment, the door may be equipped with an interlock to ensure that it is not able to be pushed in before it reaches the position in FIG. 8D so that it does not enter the pin area before being fully aligned with the side and front walls. These and other design features can be included to enable the sensor arrays to detect placement of the connector body in the corner by sensing along an entire length of the corresponding end wall and door. The door may include a metal strip or other structures to facilitate sensing by the sensor arrays.

TABLE 1

| Step | Action | Sensor 1 (Upper right) | Sensor 2 (Lower right) | Sensor 3 (Upper left) | Sensor 4 (Lower left) |
|---|---|---|---|---|---|
| Place connector onto slide surface. | Raise body with linkage until - | Z contact | Z contact | Z contact | Z contact |
| Move body to limit wall (FIG. 8B) | Move in X direction until - | X contact | none | none | None |
| Align body with limit wall (FIG. 8C) | Continue motion in X direction until - | X contact | X contact | none | None |
| Place body in corner (FIG. 8D) | Move in Y direction until - | Y contact | X or none | Y contact | none |
| Move body in engagement direction (FIG. 8E) | Move in X direction while - | Y contact | Y contact | Y contact | none |
| Determine mating complete (FIG. 8F) | Continue moving in X direction until - | XY contact | XY Contact | Y contact | Y contact |
| Uncouple connectors | Move in opposite X direction until - | Y contact | Any or none | Y contact | Any or none |

As can be seen from the above table, the alignment, mating and uncoupling operations for the connectors 34 and 38 can be automated by use of appropriate sensors that detect contact with one of the walls of the vehicle unit. The process includes moving in one direction to align the body with one wall, then moving in perpendicular direction to place the body of the connector in a corner. Once in a corner, coupling can uncoupling of the sensors can be done by motion along an axis coinciding with the axes of the pins and sockets of the sensors. In embodiments that include a protective door (315, FIG. 8D), there may be an X-contact indication from the sensor arrays before the door opens. It should be appreciated that connector coupling an decoupling can also be accomplished by using sensors on the vehicle, for example, at the end walls rather than the connector body, to provide an indication of the connector body position on the slide surface. In embodiments where a physical contact exists between the sliding door or cover to push the con- To facilitate the smooth and predictable operation of the linkage arm, a force sensor on the connector block lifting arm and on the vehicle unit door actuation mechanism can be added to sense for any obstructions during motion. The force sensor can be a dedicated force, torque sensor or load cell or it can be a current or power measurement device in the lifting arm or door mechanism actuator that is used to estimate the resulting forces.

It should be appreciated that the placement of the connector block on the linkage arm and pin receptacle on the vehicle can be reversed as desired or if advantageous for a given application, i.e. the connector block can be connected to the vehicle electrical system, and the pin receptacle could be connected to a charging cable.

Various embodiments disclosed herein are to be taken in the illustrative and explanatory sense, and should in no way be construed as limiting of the present disclosure.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A connector arrangement for charging an electric vehicle, comprising:
   a slide surface disposed on the electric vehicle, the slide surface being planar and flat;
   a first connector having a first connector body, the first connector body disposed on the electric vehicle adjacent the slide surface;
   a second connector having a second connector body, the second connector body being attached to and moveable by a linkage mechanism, wherein the linkage mechanism is configured to move the second connector body into sliding contact with the slide surface;
   at least one sensor associated with the second connector body, the at least one sensor providing information indicative of a location of the second connector body on the slide surface to the linkage mechanism; and
   a shuttle associated with the electric vehicle;
   wherein the linkage guides the second connector body in one direction, and the shuttle guides the second connector body in another direction, along the slide surface, based on information from the at least one sensor, to electrically couple the first and second connector bodies.

2. The connector arrangement of claim 1, wherein the second connector body has a rectangular shape and includes four sensors, each of the four sensors disposed at a corner of the second connector body.

3. The connector arrangement of claim 2, wherein a contact signal from two sensors disposed on one side of the second connector body indicates to the linkage mechanism alignment of the second connector body with an end wall of the slide surface in one direction, and causes the linkage mechanism to move the second connector body along the end wall in the one direction.

4. The connector arrangement of claim 3, wherein a contact signal from three sensors indicates to the linkage mechanism alignment of the second connector body with a corner between two end walls of the slide surface.

5. The connector arrangement of claim 4, wherein the shuttle is a protective door disposed between the one connector and the mating connector, wherein the linkage mechanism is arranged to allow the protective door to open when the second connector body is determined to be in the corner before moving the second connector body into engagement with the first connector body after the contact signal from the three sensors is provided to the linkage mechanism.

6. A method for automatically aligning and engaging two connectors for charging an electric vehicle, comprising:
   providing a slide surface on the electric vehicle, the slide surface having a planar, rectangular shape that is delimited by end walls;
   providing a first connector at a corner of two end walls of the slide surface;
   placing a second connector in sliding contact with the slide surface;
   sliding the second connector along the slide surface in one direction until the second connector contacts an end wall;
   aligning the second connector with the end wall;
   sliding the second connector along the slide surface in another direction along the end wall until the second connector reaches the corner; and
   pushing the second connector to mate with the first connector.

7. The method of claim 6, wherein placing the second connector on the slide surface and moving the second connector along the slide surface is accomplished by a linkage mechanism responsive to controller commands.

8. The method of claim 7, further comprising sensing contact of the second connector with the slide surface using sensors associated with the second connector, wherein placing the second connector on the slide surface further includes verifying using signals from the sensors that the second connector is placed flat on the slide surface along four corners of the second connector.

9. The method of claim 8, further comprising using the sensors to determine contact of the second connector with the end wall and the corner.

10. The method of claim 9, wherein the linkage mechanism moves the second connector along the end wall while maintaining contact with the slide surface and based on the signals from the sensors indicating that the second connector slides along the slide surface and the end wall.

11. The method of claim 6, wherein the first connector includes at least one pin, and the second connector forms at least one socket, and wherein when the second connector is placed in the corner, the at least one pin is aligned to enter into the at least one socket.

12. The method of claim 7 wherein the slide surface has a rectangular shape and is disposed on the underside of an electric vehicle, and wherein the linkage is disposed on a floor surface below the electric vehicle.

13. The method of claim 12, wherein the second connector is electrically connected to an electric voltage source, wherein the first connector is electrically connected to a battery of the electric vehicle, and wherein electric potential is transferred from the electric voltage source to charge the battery when the first connector is mated with the second connector.

14. The method of claim 6, wherein the second connector has a rectangular shape with a proximity sensor array placed in each corner laterally and also in contact with the slide surface.

15. The method of claim 14, wherein contact with the end wall is based on signals provided from one of four sensors in a lateral direction.

16. The method of claim 15, wherein alignment with the end wall is based on signals provided from two of the four sensors in the lateral direction.

17. The method of claim 16, wherein alignment with the corner is based on signals provided from three of the four sensors in the lateral direction.

18. The method of claim 17, wherein the first connector is placed in a receptacle that is enclosed on three sides, and wherein a mated position of the first connector with the mating second connector is based on a signal provided by an additional sensor associated with the first connector, which signal indicates that the second connector is fully engaged with the first connector.

19. A method for automatically coupling a charging side connector with a vehicle connector, comprising:
   providing a slide surface on an underside of an electric vehicle, the slide surface being generally flat and planar along two directions and being delimited by end walls that meet at corners, wherein the vehicle side connector is disposed at one of the corners;

lifting the charging side connector with a linkage mechanism to meet the slide surface, the linkage mechanism arranged to slide the charging side connector along the slide surface;

sliding the charging side connector along the slide surface in one direction with the linkage until the charging side connector contacts an end wall that terminates at the one corner;

aligning the charging side connector with the end wall;

sliding the charging side connector in another direction along the end wall towards the one corner until the charging side connector reaches the one corner; and engaging the charging side with the vehicle side connectors.

20. The method of claim 19, further comprising using a shuttle to move the charging side connector towards the one corner, engaging the charging side connector with the shuttle, and pulling the charging side connector with the shuttle to uncouple the charging side connector from the vehicle side connector.

\* \* \* \* \*